United States Patent [19]
Martin

[11] Patent Number: 5,923,341
[45] Date of Patent: *Jul. 13, 1999

[54] RASTER OPERATION LOOKUP AND EXECUTION

[75] Inventor: Kevin Martin, Fremont, Calif.

[73] Assignee: Network Computing Devices, Inc., Mountain View, Calif.

[*] Notice: This patent is subject to a terminal disclaimer.

[21] Appl. No.: 09/100,430

[22] Filed: Jun. 19, 1998

Related U.S. Application Data

[63] Continuation of application No. 08/731,264, Oct. 11, 1996, Pat. No. 5,825,373.

[51] Int. Cl.$^6$ .................................................. G06F 13/00
[52] U.S. Cl. ................................................................ 345/524
[58] Field of Search ................................. 345/524, 525; 395/564, 565, 561; 382/209

[56] References Cited

U.S. PATENT DOCUMENTS 5,347,631  9/1994  Providenza et al. ..................... 345/524
5,825,373  10/1998  Martin ..................................... 345/524

*Primary Examiner*—Kee M. Tung
*Attorney, Agent, or Firm*—Graham & James LLP

[57] ABSTRACT

The present invention is a method and apparatus for executing three-operand raster operation in two-operand raster environments. Structurally, the present invention includes a lookup table having one entry for each three-operand raster operation which is to be emulated. The entry associated with a particular three-operand raster operation includes a template and zero or more two-operand raster operations. Execution of the three-operand raster operation begins by retrieving the lookup table entry associated with the three-operand raster operation. Each two-operand raster operation in the lookup table entry is then executed in sequence. During execution, the template is used to provide a mapping which chooses which operands of the three-operand raster operation will be used as operands for the two-operand raster operation in the sequence.

15 Claims, 7 Drawing Sheets

Figure 5
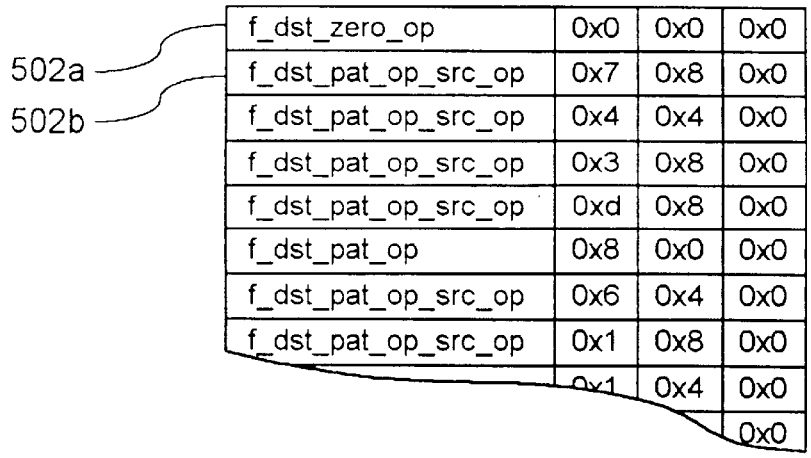
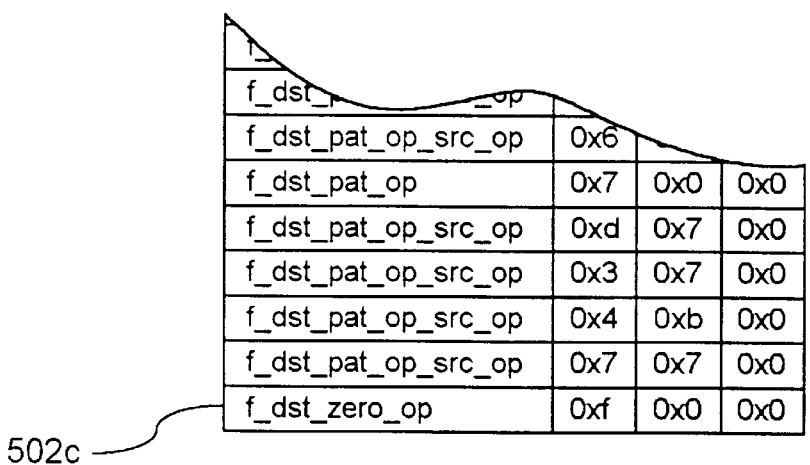
Figure 6
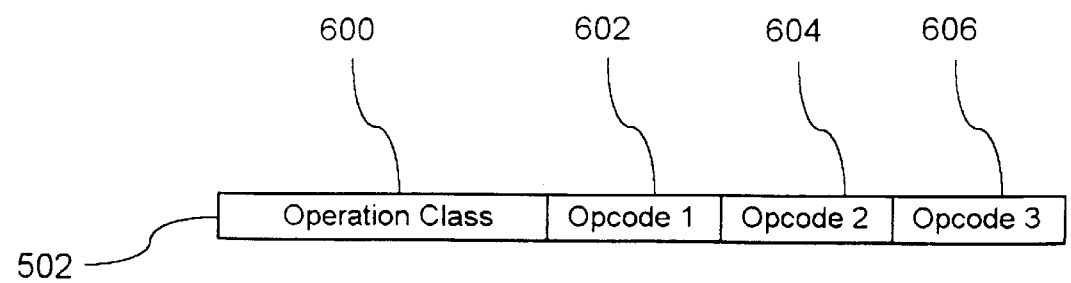

Figure 7

| class name | Destination | Source | Destination | Source | Destination | Source |
|---|---|---|---|---|---|---|
| f_dst | n/a | n/a | n/a | n/a | n/a | n/a |
| f_dst_zero_op | Destination | n/a | n/a | n/a | n/a | n/a |
| f_dst_src_op | Destination | Source 1 | n/a | n/a | n/a | n/a |
| f_dst_pat_op | Destination | Source 2 | n/a | n/a | n/a | n/a |
| f_dst_src_op_pat_op | Destination | Source 1 | Destination | Source 2 | n/a | n/a |
| f_dst_pat_op_src_op | Destination | Source 2 | Destination | Source 1 | n/a | n/a |
| f_dst_src_op_pat_op_src_op | Destination | Source 1 | Destination | Source 2 | Destination | Source 1 |
| f_dst_pat_op_src_op_pat_op | Destination | Source 2 | Destination | Source 1 | Destination | Source 2 |
| f_punt | n/a | n/a | n/a | n/a | n/a | n/a |

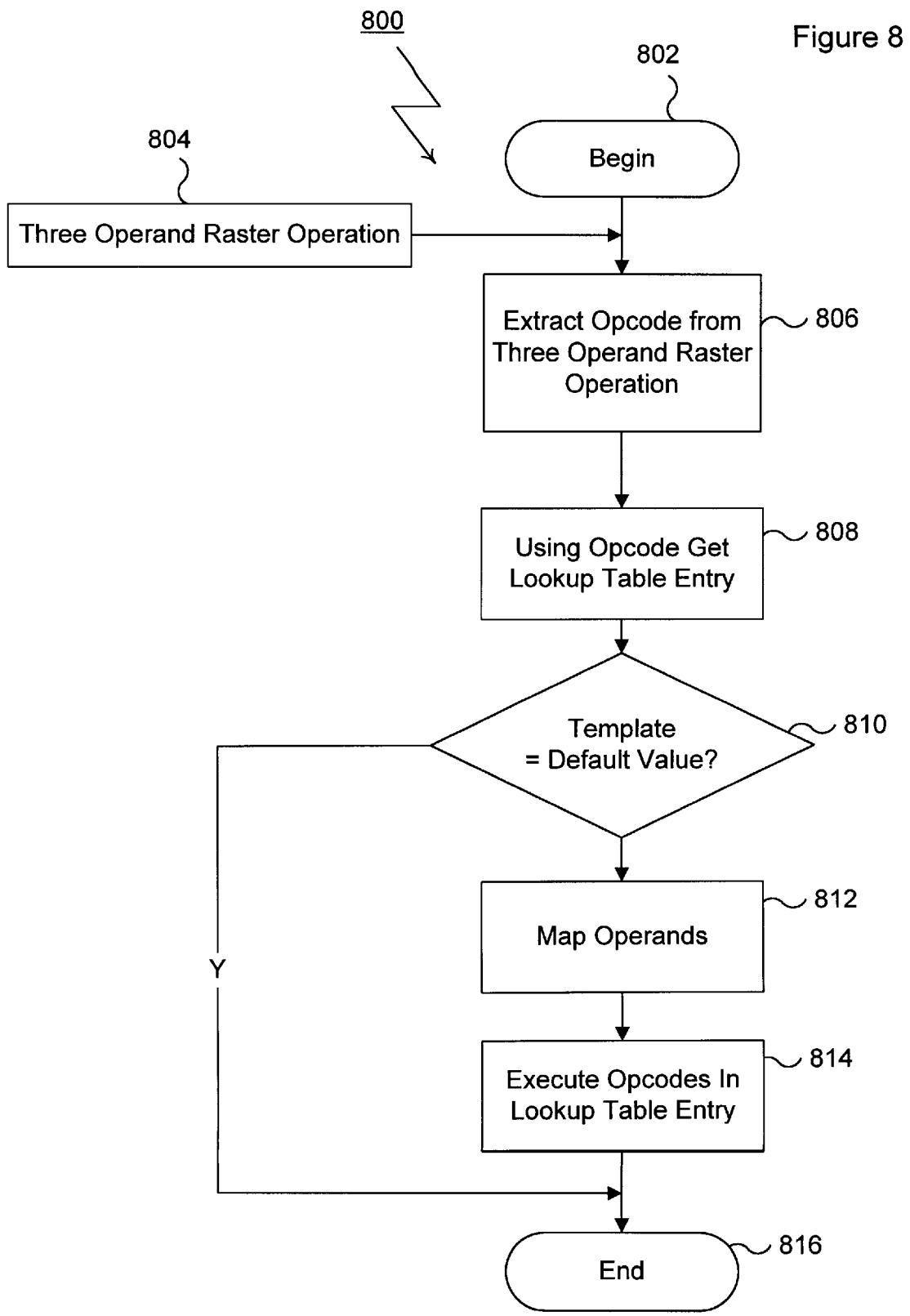

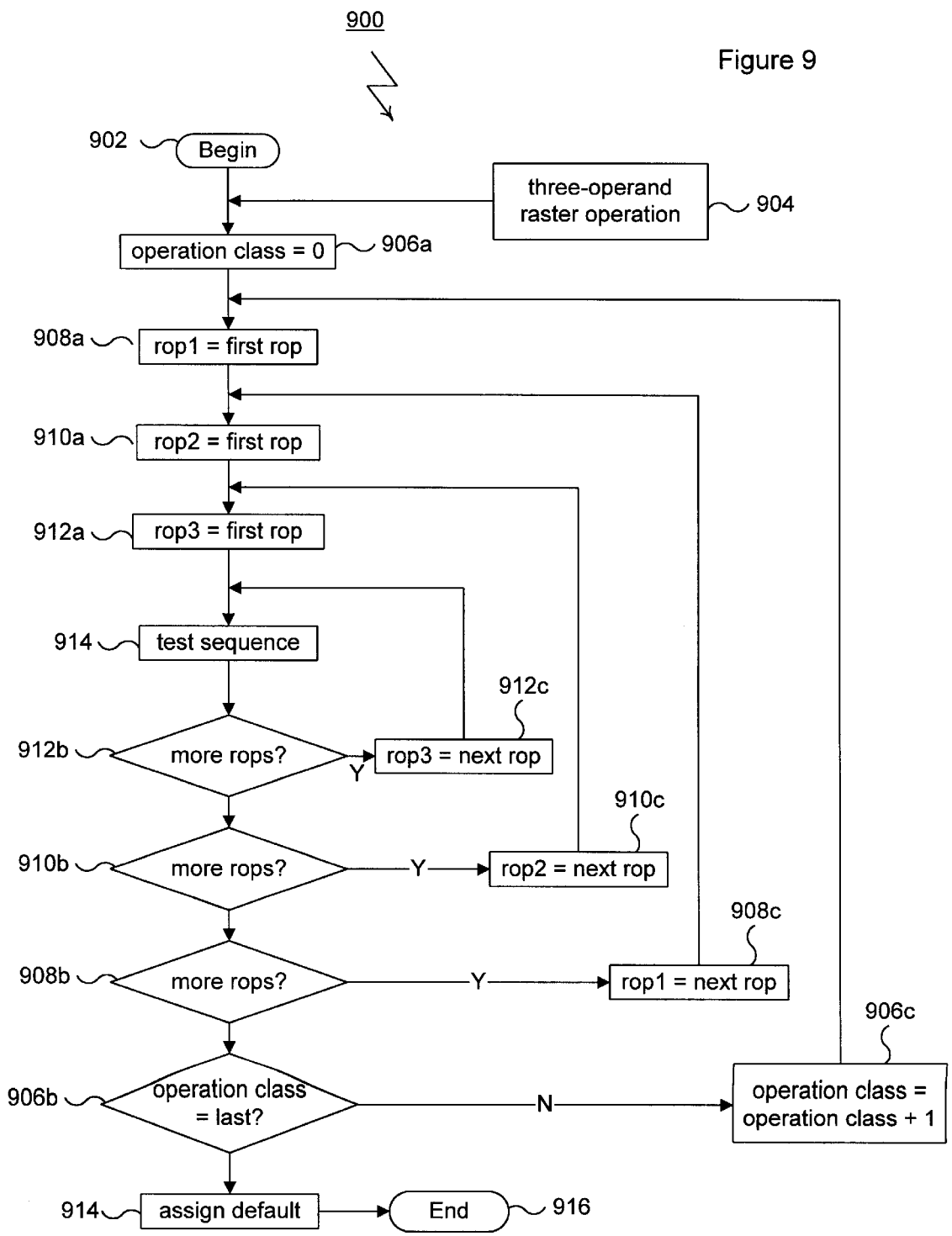

ns. RIPs
accept, as input, a sequence of instructions which resemble
the instructions used by more common processors. Like
other computer instructions, these instructions include an
operation code. RIP instructions also include two or three
operands. In two-operand systems, processing proceeds by
possibly reading a source operand, possibly reading a destination operand, performing the requested operation, and
writing the result into the destination operand. In three
operand systems, processing proceeds by possibly reading a
first source operand, possibly reading a second source
operand, possibly reading a destination operand, performing
the requested operation, and writing the result into the
destination operand.

Predictably, a number of different RIPs are commonly
used. These different RIPs use different instruction sets with
some using two operands and others using three operand
formats. One result of the diversity in RIPs has been the
development of Application Program Interfaces, or APIs, for
computer graphics. Graphics APIs are sets of standardized
routines which, when called, perform graphics functions.
Programmer's write their programs to call the functions in
the API and the API performs the work of ensuring the
correct instructions are passed to the RIP.

Unfortunately, some of the differences in RIPs are also
reflected at the API level. For example, Microsoft provides
an API for the Microsoft Windows Product. This API
specifies 256 different graphics operations, each of which
take three operands. Such an API is relatively straightforward to implement when the underlying RIP supports all 256
different graphics operations and supports the use of three-operands. In cases where an RIP implements only a smaller
number of operations or supports a smaller number of
operands, implementation of the Microsoft API may be
problematic.

As a result there is a need for a generalized approach for
executing three-operand raster operations in two-operand
raster environments. There is also a need for supporting
APIs which have a large number of different graphics
operations in graphics environments which include a smaller
number of graphics operations.

SUMMARY OF THE INVENTION

The present invention is a method and apparatus for
executing three-operand raster operations in two-operand
environments. Structurally, the present invention includes a
lookup table. The lookup table includes one entry for each
three-operand raster operation which is to be emulated. For
example, in the case of Microsoft Windows, the lookup table
has 256 entries. Each entry in the lookup table is a structure
which includes a template and a set of two-operand opcodes.
Preferably, there are nine templates with each corresponding
to a particular mapping between the three operands of a
three-operand raster operation and the two operands of
two-operand raster operations. The number of opcodes is
preferably limited to three. Thus, each lookup table entry
identifies one template and includes zero or more two-operation opcodes.

The entries in the lookup table are arranged in a numerical
order which corresponds to the ordering of the three-operand
opcodes. Thus, the first entry in the lookup table corresponds
to the first three-operand opcode (i.e. the opcode which has
a value of zero). Similarly, the last entry in the lookup table
corresponds to the last three-operand opcode (i.e. in the case
of Microsoft Windows, the opcode having a value of 255).
In this way, each three-operand opcode is mapped to an
entry in the lookup table.

The number of two-operand opcodes included in a particular lookup table entry corresponds to the number of
two-operand raster operations which must be applied in
succession to emulate a particular three-operand raster
operation. Thus, if we assume that a particular three-operand
opcode has a value of 66 and that emulation of that raster
operation requires calling three two-operand raster operations in succession, then, in the present invention, the
sixty-seventh lookup table entry will include three two-operand opcodes.

The template included in a particular lookup table entry is
a mapping between the operands of three-operand raster
operations and the operands of two-operand raster operations. More specifically, as already discussed, each lookup
table entry corresponds to a particular three-operand raster
operation. Each lookup table entry also includes a sequence
of two-operand raster operations. The template included in
each lookup table entry selects, for each two-operand raster
operation, which operands of the three-operand raster operation will serve as operands for the two-operand raster
operation.

In practice, groups of three-operand raster operations may
use a common template. Each three-operand raster operation
included in a grouping of this type may be emulated using
the same number of two-operand raster operations.
Additionally, each three-operand raster operation included
in a particular grouping may be emulated using the same
mapping between the three operands of the three-operand
raster operation and the two operands used in the sequence
of two-operand raster operations. As a result, a relatively
small number of templates may be provided for a relatively
large number of three-operand raster operations. In some
cases, it is desirable to have one template correspond to a
default value. The default value includes no two-operand
raster operations. Three-operand raster operations which use
the template having the default value are returned without
emulation. This allows certain three-operand raster operations to be emulated using an alternative methodology.

The present invention also includes an entry function. In
use, each three-operand raster operation is passed to the
entry function. Using the opcode of the three-operand raster
operation, the entry function retrieves an entry from the
lookup table. The retrieved lookup table entry includes a
template and a sequence of opcodes corresponding to two-operand raster operations. The entry function then calls, in sequence, each two-operand raster operation corresponding to one of the opcodes in the retrieved lookup table entry. Each two-operand raster operation is called with two arguments. These arguments are selected from the three operands included in the three-operand raster operation passed to the entry function. This selection is based on the template included in the retrieved lookup table entry. The result of calling the sequence of two-operand raster operations using the arguments specified by the template is emulation of the three-operand raster operation.

In general, the lookup table of the present invention may be constructed manually. Preferably, however, the lookup table is constructed using an analysis routine which compares each three-operand raster operation to sequences of two-operand raster operations. Based on this analysis, the tool finds minimal sequences of two-operand raster operations which correctly emulate three-operand raster operations. These minimal sequences are emitted as a compiler ready lookup table.

Objects and advantages of the invention will be set forth, in part, in the description which follows and, in part, will be understood by those skilled in the art from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 5 is a block diagram of the lookup table of the present invention.

FIG. 6 is a block diagram of the lookup table entry of the present invention.

FIG. 7 is a table of the showing the preferred templates of the present invention.

FIG. 8 is a flowchart of the steps executed by the entry function of the present invention.

FIG. 9 is a first flowchart showing the steps associated with the creation of a lookup table entry.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
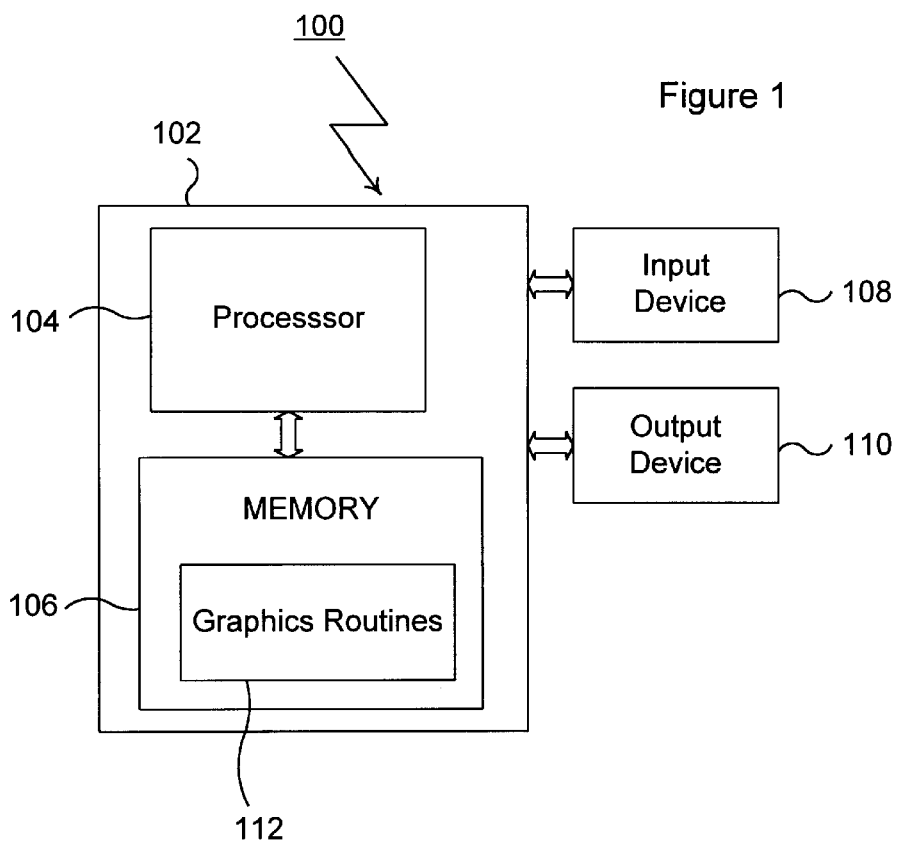
FIG. 1 is a block diagram of a computer system in accordance with a preferred embodiment of the present invention.

In FIG. 1, a data processing system 100 is shown as a representative environment for the present invention. Structurally, the data processing system 100 includes a host computer 102 which, in turn, includes a central processing unit, or CPU 104, and memory 106. An input device 108 and an output device 110 are connected to the host computer 102 and represent a wide range of varying 1/0 devices such as keyboards, modems, disk drives, network adapters, printers and displays.

Figure 2:
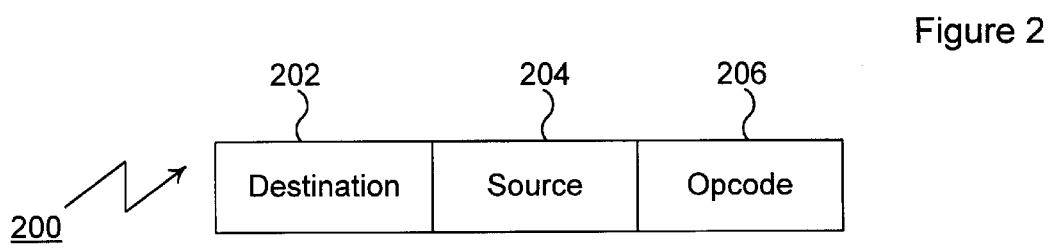
FIG. 2 is a block diagram of a two-operand raster operation as used in an NCD Explora Terminal.

FIG. 2 shows a two-operand raster operation which is generally designated 200. Two-operand raster operation 200 includes a destination operand 202, a source operand 204 and an opcode 206. For the purposes of description only, two-operand raster operation 200 is assumed to be of the type found in two-operand raster systems, such as an NCD Explora Terminal. It should be appreciated, however, that the present invention is specifically applicable to a range of two-operand environments and is not limited to the specific example shown.

Figure 3:
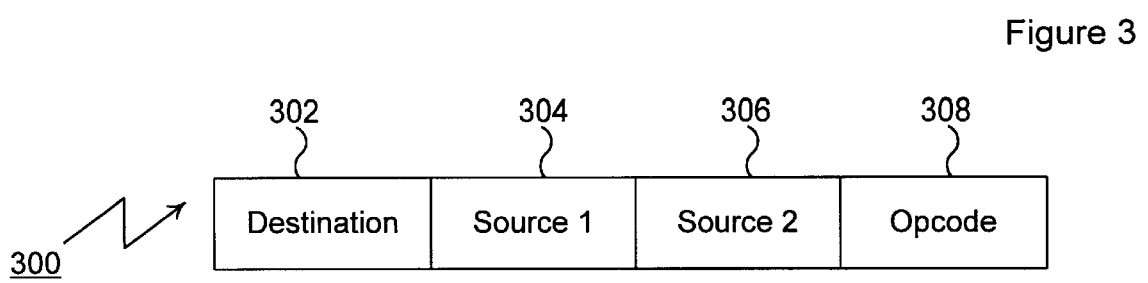
FIG. 3 is a block diagram of a three-operand raster operation as used in the Microsoft Windows API.

In FIG. 3, a three-operand raster operation is shown and generally designated 300. Three-operand raster operation includes a destination 302, a first source operand 304, a second source operand 306 and an opcode 308. For purposes of description, three-operand raster operation 300 is assumed to be of the type used in the Microsoft Windows API. It should be appreciated, however, that the present invention is specifically applicable to a range of graphics environments and is not limited to the specific example of Microsoft Windows. The opcode 308 in this example has a precision of eight bits. Thus, 256 different opcodes 308, or 256 different raster operations, are available.

In general, three-operand raster operation 300 may be more complex than two-operand raster operation 200. Alternatively, two-operand raster operation 200 may be described as being more atomic than three-operand raster operation 300. Importantly, however, it is possible to synthesize three-operand raster operation 300 using a sequence of zero or more two-operand raster operations 200. For the general case, a synthesis of this type will require the allocation of one or more temporary memory locations, or temporary pixmaps. It should be appreciated, however, that a large number of three-operand raster operations 300 may be synthesized without the use of temporary pixmaps.

Figure 4:
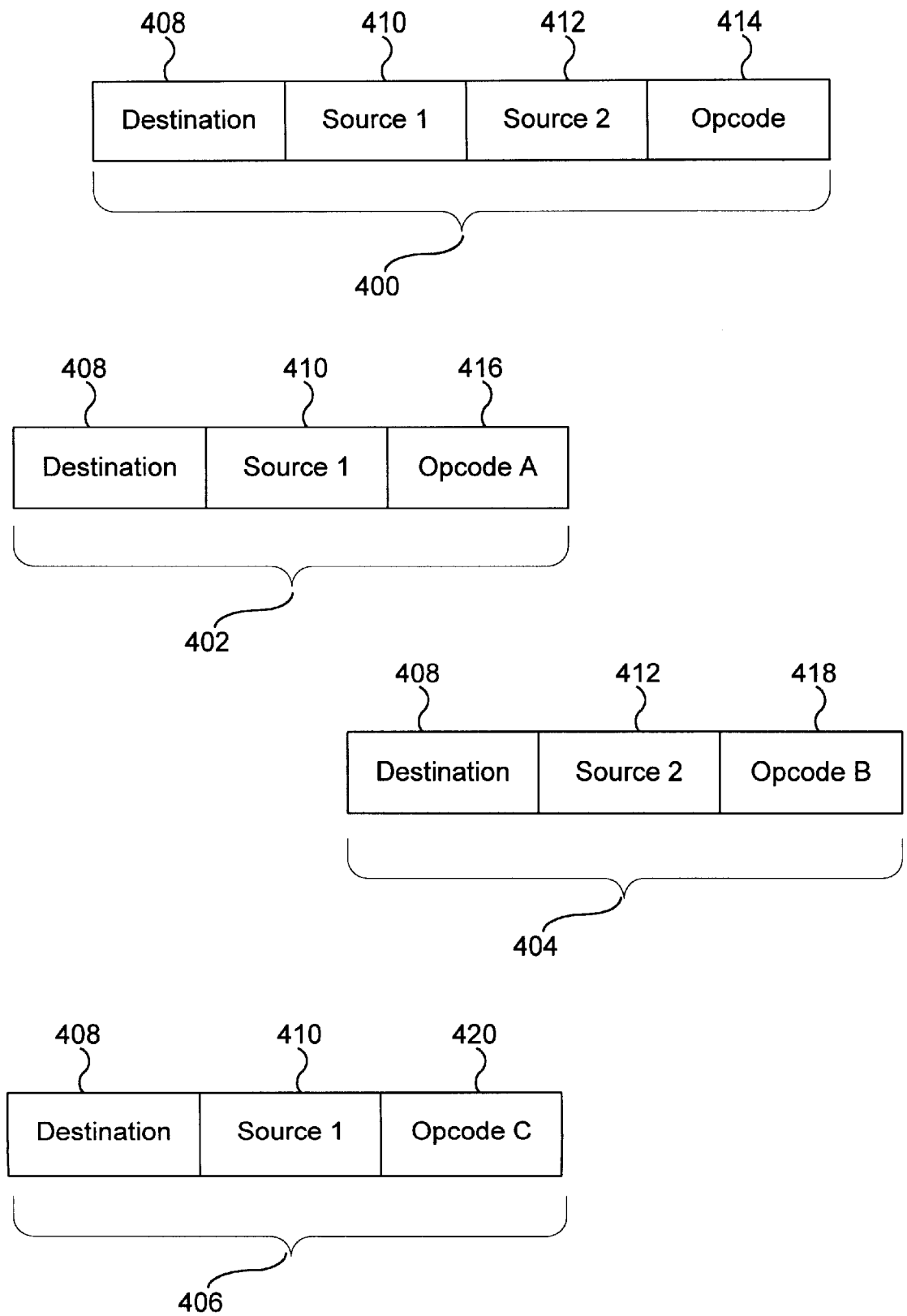
FIG. 4 is a block diagram of a three-operand raster operation and an equivalent sequence of two-operand raster operations.

A synthesis of a three-operand raster operation using two-operand raster operations is shown in FIG. 4. More specifically, in FIG. 4, a three-operand raster operation 400, is shown along with three two-operand raster operations 402 through 406. Three-operand raster operation 400 has a destination 408, a first source operand 410, a second source operand 412 and an opcode 414. Two-operand raster operation 402 has the same destination operand 408 and source operand 410 as three-operand raster operation 400. Two-operand raster operation 402 also has an opcode 416. Similarly, two-operand raster operation 404 has an opcode 418 but shares destination operand 408 and source operand 412 with three-operand raster operation 400. Finally, two-operand raster operation 406 has an opcode 420 and has destination operand 408 and source operand 412 of three-operand raster operation 400. Together, two-operand raster operations 402 through 406 represent a sequence of three different two-operand raster operations each having its own opcode 416, 418 and 420, respectively. Each two-operand raster operations 402 through 406 takes its operands from three-operand raster operation 400. When executed in sequence, using the operands shown, the sequence of two-operand raster operations 402 through 406 have the same effect as execution of the single three-operand raster operation 400.

Structurally, and as shown in FIG. 5, the present invention includes a lookup table 500. The lookup table 500 includes a series of entries of which entry 502a, 502b and 502c are representative. A single entry 502 is shown in FIG. 6 to include a template 600, a first opcode 602, a second opcode 604 and a third opcode 606. Each opcode 602, 604 and 606 is a two-operand opcode of the type described with reference to FIG. 2. Lookup table 500 preferably includes one entry 502 for each three-operand opcode which must be emulated by a particular embodiment of the present invention. For example, in cases where the present invention is intended to be used to emulate the three-operand raster operations in the Microsoft Windows API, the lookup table 500 will preferably include 256 entries 502. It should also be appreciated that the present invention is not limited to a table structure. In fact, any data structure which provides a mapping between three-operand raster operations and a series of entries may be effectively employed.

The entries in the lookup table 500 are arranged in a numerical order which corresponds to the ordering of the opcodes of the three-operand raster operations to be emulated. Thus, the first entry 502a in the lookup table 500 corresponds to the three-operand opcode which has a value of zero. Similarly, the last entry 502c in the lookup table 500 corresponds to the last three-operand opcode, or in the case of Microsoft Windows the opcode which has a value of 255. In this way, each three-operand opcode is mapped to an entry 502 in the lookup table 500. More particularly, each three-operand opcode is mapped to a particular template 600 and zero of more two-operand opcodes 602, 604 and 606.

As shown in FIG. 6, each lookup table entry 502 may include a template 600. The template 600 included in a particular lookup table entry 502 is a mapping between the operands of three-operand raster operations and the operands of two-operand raster operations. More specifically, as already discussed, each lookup table entry 502 corresponds to a particular three-operand raster operation. Each lookup table entry 502 also includes a sequence of two-operand raster operations. The template 600 included in each lookup table selects, for each two-operand raster operation, which operands of the three-operand raster operation will serve as operands for the two-operand raster operation.

For example, in the emulation sequence of FIG. 4, it may be seen that each of the two-operand raster operations 402, 404 and 406 uses some combination of operands 408, 410 or 412 of three-operand raster operation 400. Thus, emulation of a three-operand raster operation requires not only generation of a sequence of two-operand raster operations, but also mapping the operands of the original three-operand raster operation onto the operands of the two-operand raster sequences in the emulation sequence. In the present invention, this mapping is defined by the template 600 included in an entry 502.

In general, many three-operand raster operations require the same mapping of operands for emulation. Therefore, the number of templates 600 may be less than the number of three-operand raster operations to be emulated. The number of templates included is dependent on a number of factors including, but not limited to, the type of three-operand raster operations to be emulated, the type of two-operand raster operations which will be used to emulate the three-operand raster operations, the number of two-operand raster operations which will be allowed in a particular sequence, and whether the use of temporary pixmaps will be allowed. Preferably, however, for the case of emulation of the three-operand raster operations in the Microsoft Windows API, the number of templates will be fixed at nine. Each of the nine preferred templates is shown in FIG. 7. For example, the template 600 with the symbolic name f__dst__src__op__pat__op is usable with three-operand raster operations which may be emulated using a sequence of two two-operand raster operations. When executing the sequence of two-operand raster operations according to the f__dst__src__op__pat__op, the first operation is called with the first source and destination and the second operation is called with the second source and destination.

Three of the templates 600 included in the table of FIG. 7 are somewhat specialized. The first of these has the symbolic name f__dst. This template is intended to function as a no operation allowing emulation of three-operand raster operations which do not modify their destination operands.

The second specialized template 600 is symbolically named f__dst__zero__op. This template allows emulation of three-operand raster operations which modify their destination operands but do not use a source operand to do so. An example of this type of three-operand raster operation is a fill type operation which writes a pre-defined bit pattern into a destination operand.

The present invention also includes a specialized template 600 with the symbolic name f__punt. The f__punt template is special because it indicates that no processing of the three-operand raster operation is to be performed. Instead, the operation is returned unprocessed, allowing the operation to be implemented using an alternative, possibly slower, methodology. The overall result is that a limited number of templates 600 may be provided and three operation raster operations which do not "fit" into one of these templates may be handled using an alternate methodology.

The combination of the nine templates 600 included in FIG. 7 is a preferable combination for the following reasons: 1) the nine entries allow for emulation of each three-operand raster operation which may be emulated without the use of a temporary pixmap, 2) the nine entries allow each emulated three-operand raster operation to be emulated using a minimal sequence of two-operand raster operations, and 3) each sequence of two-operand raster operations has minimal complexity. Omitting any of the nine templates 600 would either emulate fewer three-operand raster operations or would increase the complexity of the emulations (i.e. at least some emulations would require longer sequences of two-operand raster operations).

The present invention also includes an entry function. Use of the entry function is shown symbolically in FIG. 8 as flowchart 800. Flowchart 800 begins with start box 802 which corresponds, in a general way, to the calling of the entry function. Box 804 shows a three-operand raster operation being input to the entry function. This will generally occur by passing the three-operand raster operation as an argument, or arguments, to the entry function. Other communication methods may be employed, however, without departing from the spirit of the present invention.

In box 806 the opcode is extracted from the three-operand raster operation. In the general case, the three-operand raster operation will be passed to the entry function as a series of arguments, including an opcode and three-operands. In these cases, there is no need to extract the opcode from the three-operand raster operation. In other cases, the three-operand raster operation may be passed as a single structure or aggregate. In these cases, the opcode may be extracted using structure operations or by using an appropriate combination of bit field operations. Therefore, box 806 is included to represent any operations which may be required to obtain the opcode for the three-operand raster operation that is to be emulated. In box 808, the opcode extracted in box 806 is used as an index into the lookup table 500. In this way, the lookup table entry 502 which corresponds to the opcode and the three-operand raster operation is extracted from the lookup table 500.

In box 810 the value of the template 600 in the lookup table entry 502 is compared to the default value. If template 600 is equal to the default value emulation of the three-operand raster operation is terminated. This allows certain three-operand raster operations to be emulated using an alternate methodology.

In box 812, the template 600 of the lookup table entry 502 is used to map the operands of the three-operand raster operation to the templates of the zero or more two-operand raster operations in the lookup table entry 502.

In box 814, the lookup table entry 502 is used to emulate the three-operand raster operation. More specifically, from zero or more two-operand raster operations are executed in sequence using two-operand opcodes 602 through 606 as necessary. As part of this execution, the template 600 of the entry 502 is used to determined which of the three-operand raster operation's operands will be used as operands for the two-operand raster operations which correspond to the opcodes 602 through 606. Execution of the entry function, and emulation of the three-operand raster operation terminates at box 816.

A method for automatically generating a lookup table entry 502 for a given three-operand raster operation is shown in FIG. 9 and generally designated 900. The first step of method 900 is a symbolic start symbol 902. Following start 902 is step 904 which represents input of the three-operand raster operation for which a lookup table entry 502 will be generated. Input of the three-operand raster operation in box 904 is followed, in a general sense, by four nested loops. The first and outer most of these loops includes steps 906*a* through 906*c*. Loop 906 iterates through all but the last template 600. The last template 600 is not included in the iteration of the loop 906, but is selected in the process of generating the lookup table 500 if no other template 600 can be used. Therefore, in the embodiment described, loop 906 iterates through eight different templates 600. Preferably, the loop 906 is configured to start with the least complex templates 600 and move to successively more complex templates 600 with each iteration. This corresponds to the ordering of the templates 600 shown in FIG. 7.

The next inner most loop includes steps 908*a* through 908*c*. Loop 908 iterates through the opcodes of the two-operand raster operations which may be used for emulation. Similarly, the next two inner most loops, loop 910 and 912 both iterate though the same set of two-operand opcodes. Importantly, for a preferred embodiment of the present invention, each of the loops 908, 910 and 912 is configured to iterate through the two-operand opcodes in a specific, predetermined order. In this order, simple two-operand opcodes (i.e. those that would be expected to have the shortest time of execution) appear first. More complex two-operand opcodes appear later in the order. The number of iterations of each loop 908, 910 and 912 is based on the template 600 selected in loop 906. Thus, if the particular template 600 selected requires only two two-operand raster operations, loops 908, 910 and 912 are controlled so that only two of the three loops 908, 910 and 912 are executed. Likewise, if the particular template 600 selected requires only a single two-operand raster operation, loops 908, 910 and 912 are controlled so only a single loop 908, 910 and 912 is traversed. The overall result of loops 906, 908, 910 and 912 is to generate a sequence of permutations where each permutation includes a template 600 and zero or more two-operand raster opcodes.

Figure 10:
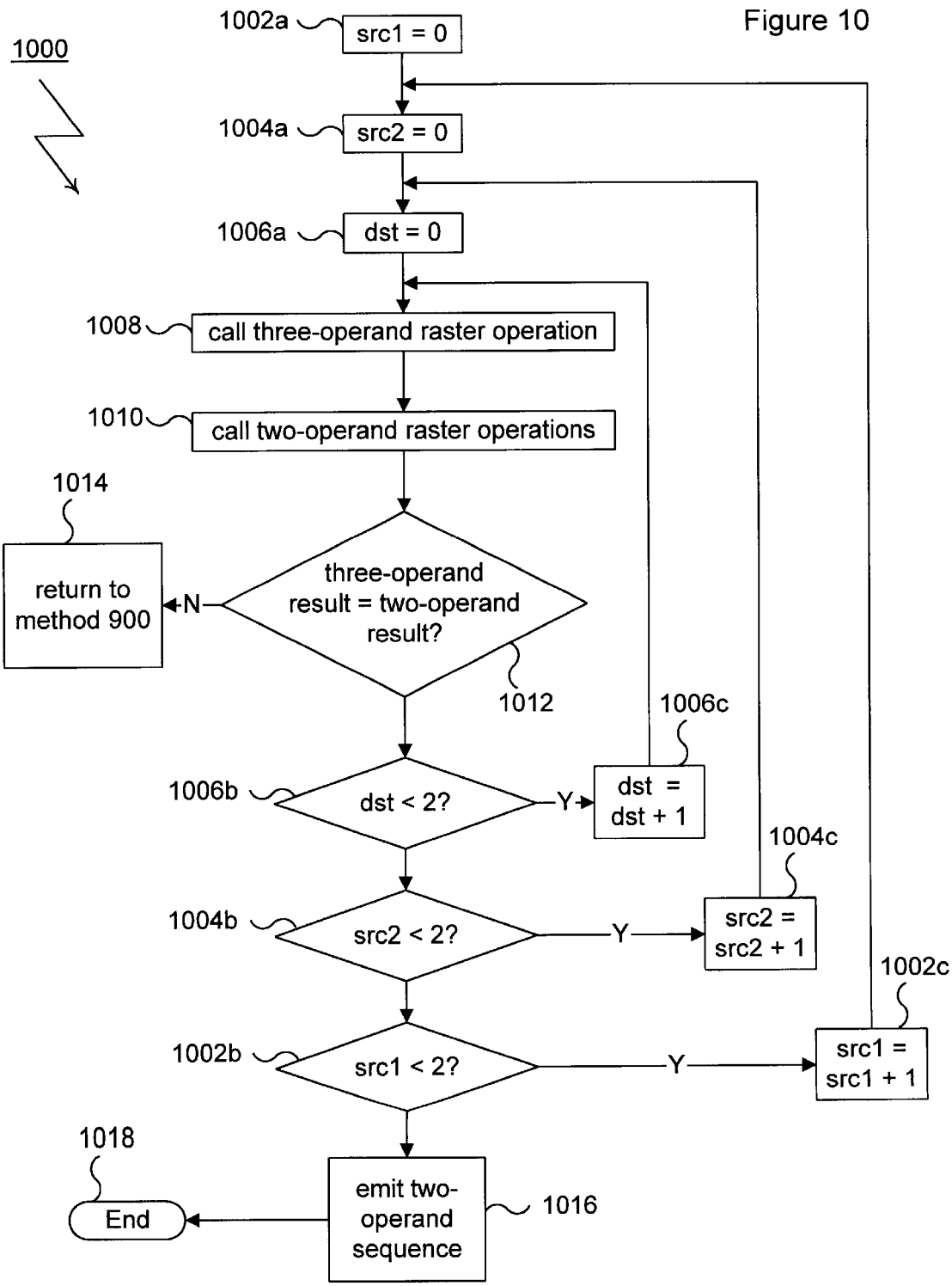
FIG. 10 is a second flowchart showing additional steps associated with the creation of the lookup table entry.

Each permutation generated by loops 906, 908, 910 and 912 is passed to a testing routine at box 914. The steps which correspond to box 914 are shown more clearly as method 1000 of FIG. 10. Importantly, it should be appreciated that at the start of method 1000 the following entities have been defined: 1) a three-opcode raster operation, 2) a template, and 3) a set of three two-operand raster operations. Method 1000 includes three nested loops 1002, 1004 and 1006. Each of these loops iterates through a short sequence of bit patterns. More specifically, each loop 1002, 1004 and 1006 iterates through the values 0 and 1.

In step 1008 the three-operand raster operation input in step 904 of method 900 is called using the bit patterns as operands. More specifically, in step 1008, the three-operand raster operation is called using the bit pattern generated by loop 1006 as the destination, the bit pattern generated by loop 1002 as the first source and the bit pattern generated by loop 1004 as the second source.

In step 1010 an attempt is made to emulate the three-operand raster operation by applying zero or more of the two-operand raster operations generated in loops 908, 910 and 912 in sequence, depending on the template selected in loop 906. More specifically, in step 1010, the two-operand raster operations are called using the bit patterns generated in loops 1002, 1004 and 1006 as source and destination operands. The bit patterns are mapped to the source and destination of the two-operand raster operations using the template selected in loop 906. The results of the three-operand raster operation called in step 1008 and the sequence of two-operand raster operations called in step 1010 are compared in step 1012. If the results differ, execution of the test sequence is ended at box 1014 and continues in the context of method 900. Alternatively, if the operations return identical results, execution of method 1000 continues. In this way, the three-operand raster operation is compared against the sequence of two-operand raster operations for a total of eight permutations of bit patterns. Assuming that no differences are detected during any of the eight executions of step 1012, execution of method 1000 will reach step 1016 where the sequence of opcodes generated in 908, 910 and 912 as well as the template selected in loop 906, are output as a lookup table entry 502 for the three-operand raster operation input in step 904. Execution of method 900 then ends at step 1018. Importantly, termination of method 1000 at step 1018 ends both method 1000 as well as method 900. In this way, methods 900 and 1000 do not continue to search for an emulation sequence or template 600 after emitting the sequence of opcodes and template 600 in step 1016. This prevents methods 900 and 1000 from locating another, less efficient combination of template 600 and two-operand raster operations which emulate the three operand raster operation input at step 904.

As described in the preceding paragraphs, execution of method 900 may terminate either by returning to method 900 (at box 1014) or by terminating method 900 and method 1000 (at box 1018). The later case, of course, indicates that a lookup table entry 502 has been generated for the three-operand raster operation input in step 904. In some cases, the outer loop 906 of method 900 will terminate without a lookup table entry 502 ever being emitted at box 1016. In these cases, execution of method 900 will pass to step 914 where a lookup table 502 having a default value for a template 600 will be emitted. This default value will cause the three-operand raster operation input in step 904 to be emulated using an alternate methodology.

The entire sequence of methods 900 and 1000 may be repeated for additional three-operand raster operations to generate an entire lookup table 500.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for emulating n-operand raster operations in an m-operand raster environment where n is greater than m, the method comprising the following steps:

retrieving an entry which corresponds to an m-operand raster operation to be emulated, the entry including a sequence of zero or more n-operand raster operations;

mapping the operands of the m-operand raster operation to the operands of the zero or more n-operand raster operations; and executing each of the zero or more n-operand raster operations in the lookup table entry.

2. A method as recited in claim 1 wherein the entry includes a template, the template mapping the operands of the m-operand raster operation to be emulated to the operands of the sequence of zero or more n-operand raster operations.

3. A method as recited in claim 2 which further comprises the step of:

bypassing the step of mapping the operands of the m-operand raster operation if the template is equal to a default value.

4. A method as recited in claim 2 which further comprises the step of:

bypassing the step of executing each of the zero or more n-operand raster operations if the template is equal to a default value.

5. A method as recited in claim 1 further comprising the step of providing a lookup table, the lookup table including the entry within a series of entries.

6. A computer program product comprising:

a computer usable medium having computer readable code embodied therein for emulating n-operand raster operations in an m-operand raster environment where n is greater than m, the computer program product comprising:

first computer readable program code devices configured to cause a computer system to retrieve an entry which corresponds to an m-operand raster operation to be emulated, the entry including a sequence of zero or more n-operand raster operations;

second computer readable program code devices configured to cause a computer system to map the operands of the m-operand raster operation to the operands of the zero or more n-operand raster operations; and third computer readable program code devices configured to cause a computer system to execute each of the zero or more n-operand raster operations in the lookup table entry.

7. A computer program product as recited in claim 6 wherein the entry includes a template, the template mapping the operands of the m-operand raster operation to be emulated to the operands of the sequence of zero or more n-operand raster operations.

8. A computer program product as recited in claim 7 which further comprises: fourth computer readable program code devices configured to cause a computer system to bypass the step of mapping the operands of the m-operand raster operation if the template is equal to a default value.

9. A computer program product as recited in claim 7 which further comprises: fifth computer readable program code devices configured to cause a computer system to bypass the step of executing each of the zero or more n-operand raster operations if the template is equal to a default value.

10. A computer program product as recited in claim 6 wherein the entry is included in a lookup table.

11. An apparatus for emulating n-operand raster operations in an m-operand raster environment where n is greater than m, the computer program product comprising:

means for retrieving an entry which corresponds to an m-operand raster operation to be emulated, the entry including a sequence of zero or more n-operand raster operations;

means for mapping the operands of the m-operand raster operation to the operands of the zero or more n-operand raster operations; and means for executing each of the zero or more n-operand raster operations in the lookup table entry.

12. An apparatus as recited in claim 11 wherein the entry includes a template, the template mapping the operands of the m-operand raster operation to be emulated to the operands of the sequence of zero or more n-operand raster operations.

13. An apparatus as recited in claim 12 which further comprises:

means for bypassing the step of mapping the operands of the m-operand raster operation if the template is equal to a default value.

14. An apparatus as recited in claim 12 which further comprises:

means for bypassing the step of executing each of the zero or more n-operand raster operations if the template is equal to a default value.

15. An apparatus as recited in claim 11 wherein the entry is included in a lookup table.

* * * * *